(12) United States Patent
Jo et al.

(10) Patent No.: US 11,338,667 B2
(45) Date of Patent: *May 24, 2022

(54) CURVE-COMBINED SQUARE PRESSURE TANK

(71) Applicant: LATTICETECHNOLOGY CO., LTD., Daejeon (KR)

(72) Inventors: Choonghee Jo, Daejeon (KR); Hoon Jin Park, Seong-si (KR); Keun Oh Park, Daejeon (KR)

(73) Assignee: LATTICETECHNOLOGY CO., LTD., Daejeon (KR)

( * ) Notice: Subject to any disclaimer, the term of this patent is extended or adjusted under 35 U.S.C. 154(b) by 51 days.

This patent is subject to a terminal disclaimer.

(21) Appl. No.: 16/707,687

(22) Filed: Dec. 9, 2019

(65) Prior Publication Data

US 2020/0108712 A1 Apr. 9, 2020

Related U.S. Application Data

(62) Division of application No. 16/080,181, filed as application No. PCT/KR2017/002153 on Feb. 27, 2017, now Pat. No. 10,543,745.

(30) Foreign Application Priority Data

Feb. 26, 2016 (KR) .......................... 10-2016-0023008

(51) Int. Cl.
*B64D 37/06* (2006.01)
*B60K 15/03* (2006.01)
(Continued)

(52) U.S. Cl.
CPC ........ *B60K 15/03006* (2013.01); *B60K 15/03* (2013.01); *B63B 11/04* (2013.01);
(Continued)

(58) Field of Classification Search
CPC .............. B60K 15/03006; B60K 15/03; B60K 15/073; B60K 2015/03032;
(Continued)

(56) References Cited

U.S. PATENT DOCUMENTS

| 6,595,382 B2 * | 7/2003 | Ettlinger ............... F17C 13/005 |
| | | 220/560.11 |
| 6,729,492 B2 | 5/2004 | Gulati |

(Continued)

FOREIGN PATENT DOCUMENTS

| CN | 203757362 U | 8/2014 |
| DE | 19749950 A1 | 5/1999 |

(Continued)

OTHER PUBLICATIONS

Singapore Search Report issued in corresponding Singapore Application No. 11201808282Y, dated Jan. 24, 2020, pp. 1-3, Intellectual Property Office of Singapore, Singapore.

(Continued)

*Primary Examiner* — Don M Anderson
*Assistant Examiner* — Elizabeth J Volz
(74) *Attorney, Agent, or Firm* — Hauptman Ham, LLP

(57) ABSTRACT

The present invention relates to a curve-combined square pressure tank with which curves are combined so as to maintain internal high pressure, improve space efficiency, and reduce the weight thereof, and to a pressure tank, in which planes and curves are combined, formed by connecting flat plate members and curved members, having a plurality of aligned tension members for connecting the flat plate members facing each other, and having stress buffer parts formed at connection parts of the flat plate members and the curved members so as to enable internal pressure to be maintained.

5 Claims, 25 Drawing Sheets

(51) Int. Cl.
  *B63B 11/04* (2006.01)
  *B63B 25/16* (2006.01)
  *F17C 3/00* (2006.01)
  *B63B 17/00* (2006.01)
  *F17C 1/08* (2006.01)
  *F17C 13/00* (2006.01)
  *B60K 15/073* (2006.01)

(52) U.S. Cl.
  CPC .......... *B63B 17/00* (2013.01); *B63B 17/0027* (2013.01); *B63B 25/16* (2013.01); *F17C 1/08* (2013.01); *F17C 3/00* (2013.01); *F17C 13/002* (2013.01); *B60K 15/073* (2013.01); *B60K 2015/03032* (2013.01); *B60K 2015/03453* (2013.01); *F17C 2201/0147* (2013.01); *F17C 2201/056* (2013.01); *F17C 2203/013* (2013.01); *F17C 2221/033* (2013.01); *F17C 2223/0123* (2013.01); *F17C 2223/0153* (2013.01); *F17C 2223/0161* (2013.01); *F17C 2260/018* (2013.01); *F17C 2270/0176* (2013.01); *F17C 2270/0178* (2013.01)

(58) Field of Classification Search
  CPC .......... B60K 2015/03453; B63B 11/04; B63B 17/00; B63B 17/0027; B63B 25/16; F17C 3/00; F17C 13/00; F17C 13/02; F17C 2201/0147; F17C 2201/056; F17C 2203/013; F17C 2221/033; F17C 2223/0161; F17C 2223/0123; F17C 2223/0153; F17C 2260/018; F17C 2270/0176; F17C 2270/0178; F17C 1/08

USPC .............................. 220/581, 651, 4.12, 565
  See application file for complete search history.

(56) References Cited

U.S. PATENT DOCUMENTS

| 10,543,745 B2* | 1/2020 | Jo .......................... B63B 17/00 |
| 2008/0314908 A1 | 12/2008 | Bakken et al. |
| 2014/0034653 A1 | 2/2014 | Chang et al. |
| 2014/0117163 A1 | 5/2014 | Simpson |

FOREIGN PATENT DOCUMENTS

| EP | 1388705 A2 | 2/2004 |
| EP | 1493961 A2 | 1/2005 |
| JP | 2012-515316 | 7/2012 |
| JP | 2014-516399 | 7/2014 |
| KR | 10-0840032 | 6/2008 |
| KR | 10-2016-0010263 | 1/2016 |
| SG | 10201904431 X | 2/2017 |
| WO | 0032486 | 6/2000 |

OTHER PUBLICATIONS

Singapore Written Opinion issued in corresponding Singapore Application No. 11201808282Y, dated Dec. 7, 2020, pp. 1-6, Intellectual Property Office of Singapore, Singapore.

International Search Report dated May 18, 2017 from corresponding application No. PCT/KR2017/002153.

European Search Report issued in corresponding European Application No. 17756888.8 dated Oct. 7, 2019, pp. 1-8, European Patent Office, Munich, Germany.

* cited by examiner

[FIG. 1]
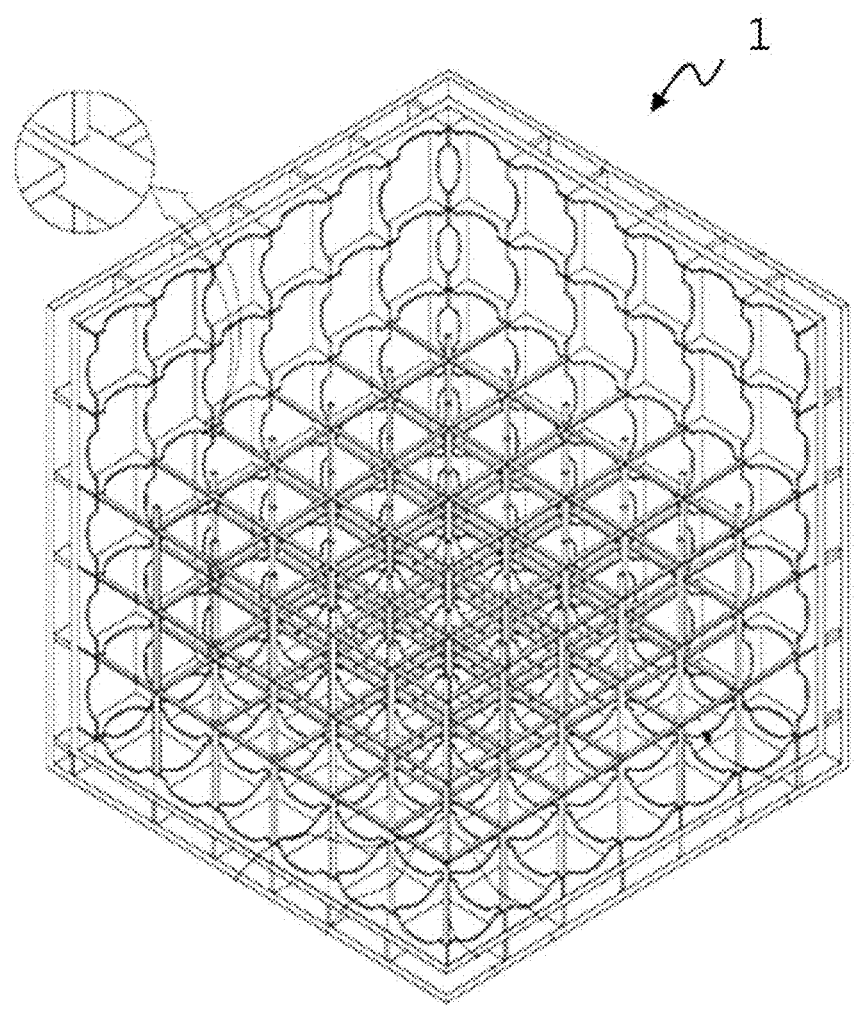

[FIG. 2]
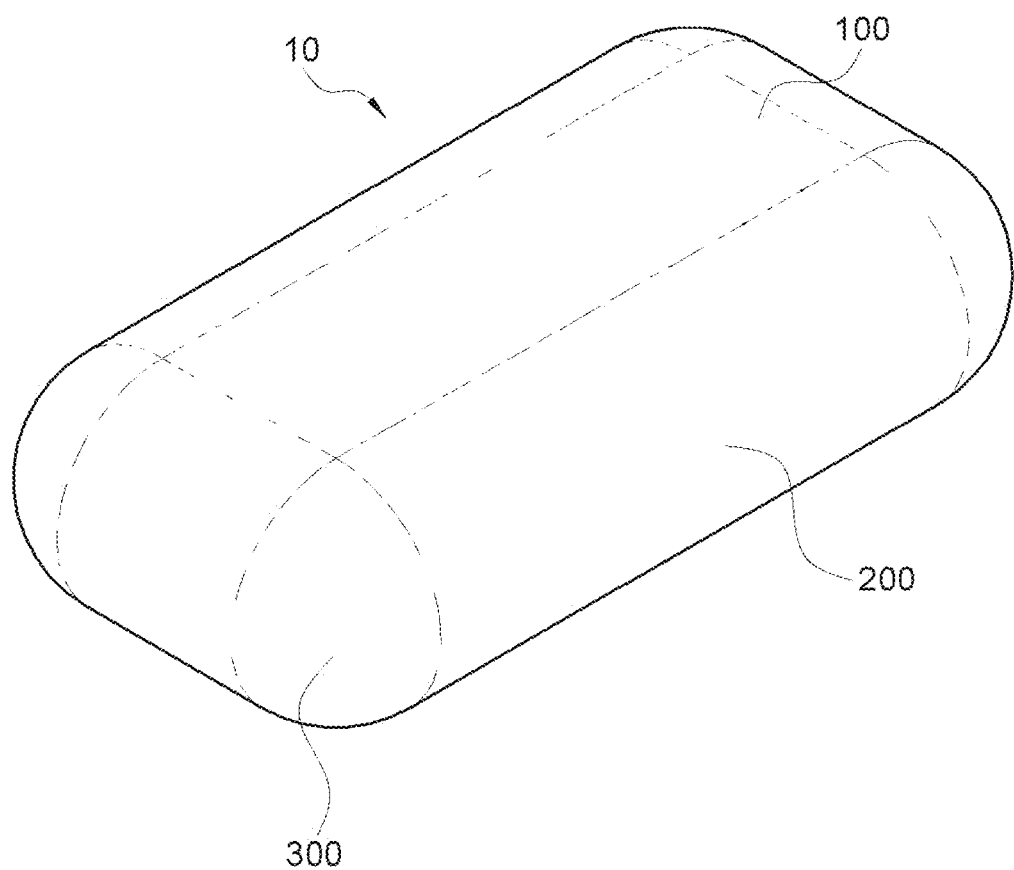

[FIG. 3]
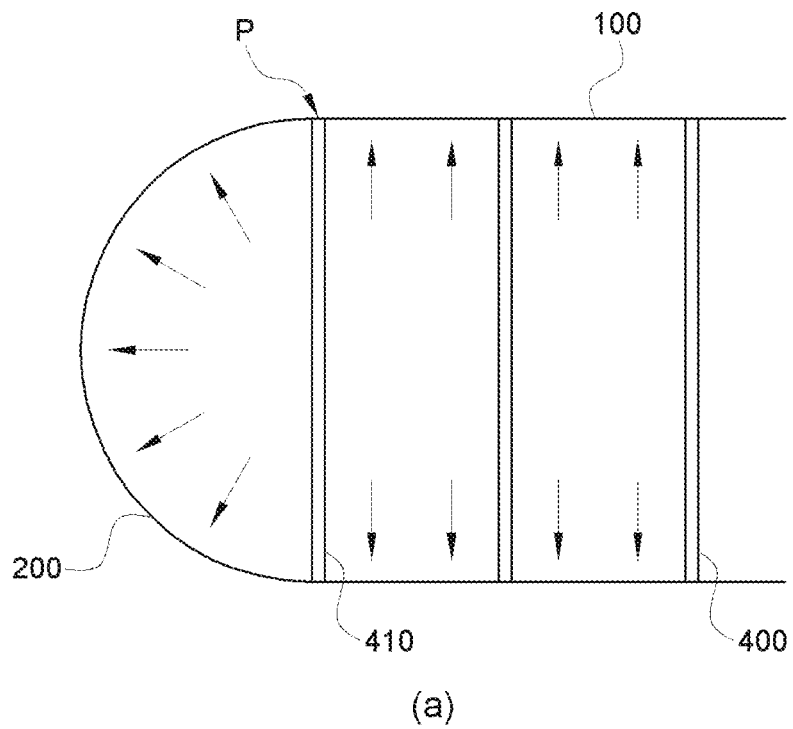
(a)
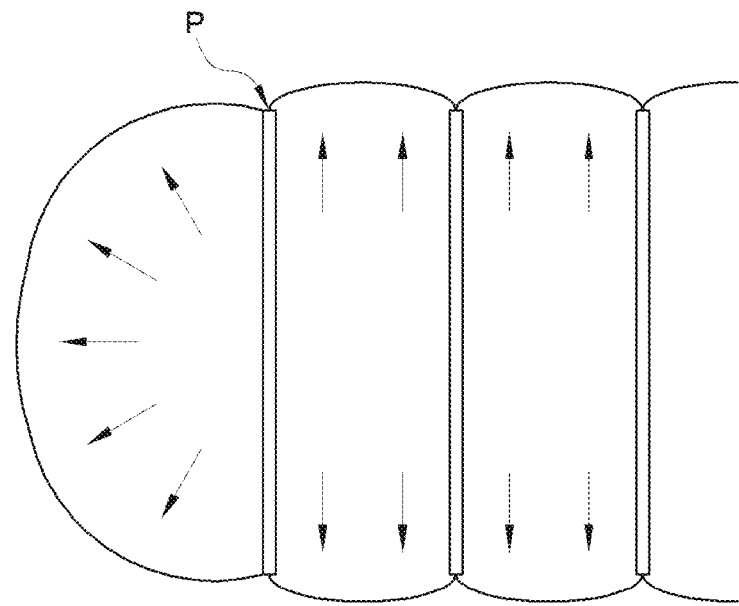
(b)

[FIG. 4]
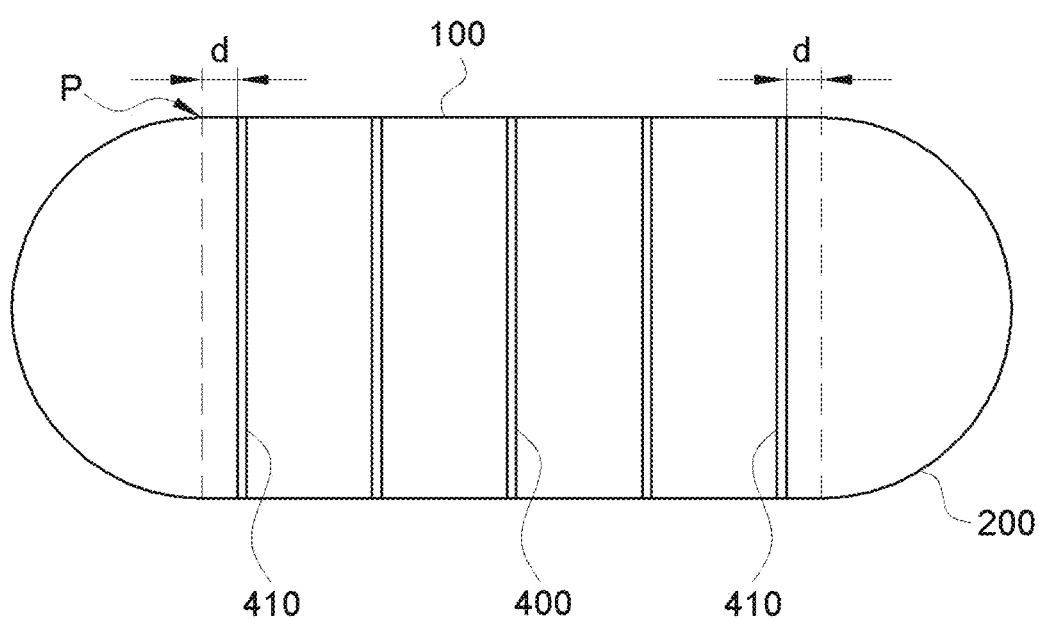

[FIG. 5]
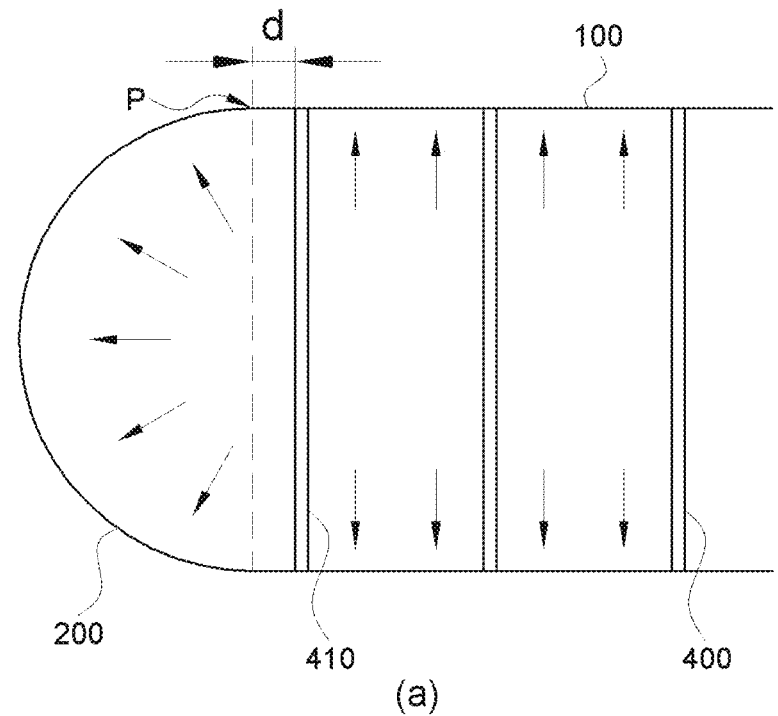
(a)
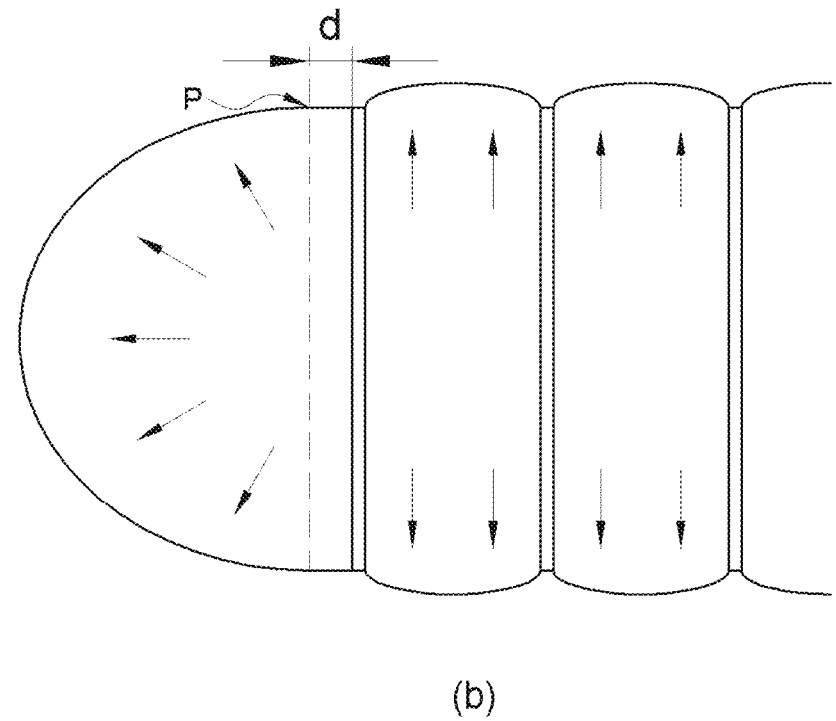
(b)

[FIG. 6]
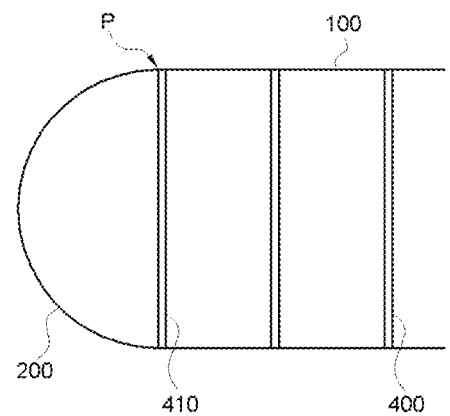
(a)
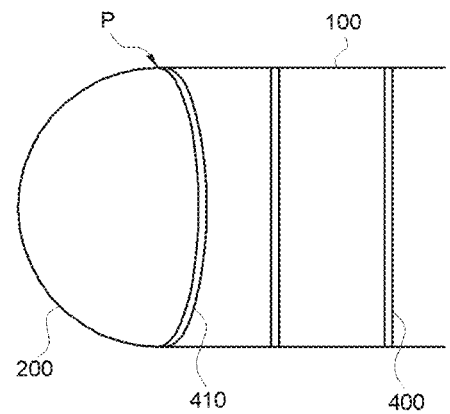
(b)
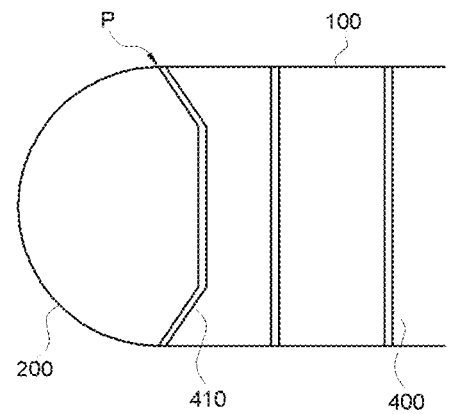
(c)

[FIG. 7]
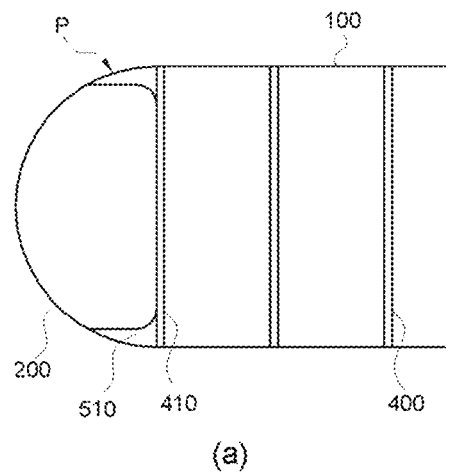
(a)
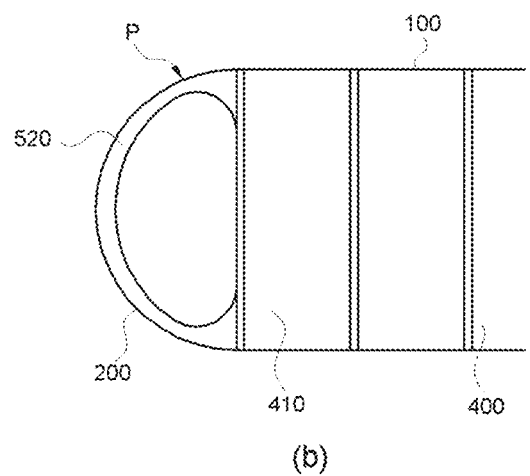
(b)
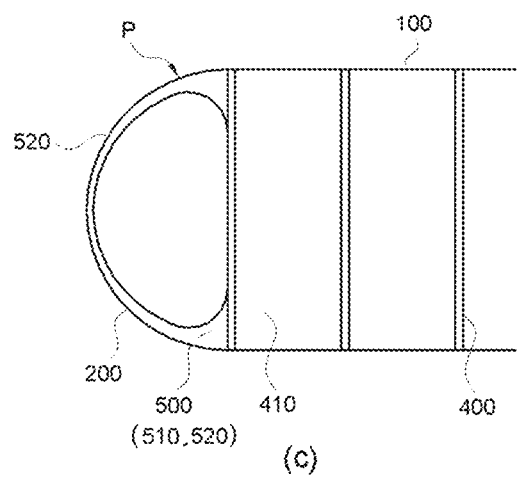
(c)

[FIG. 8]
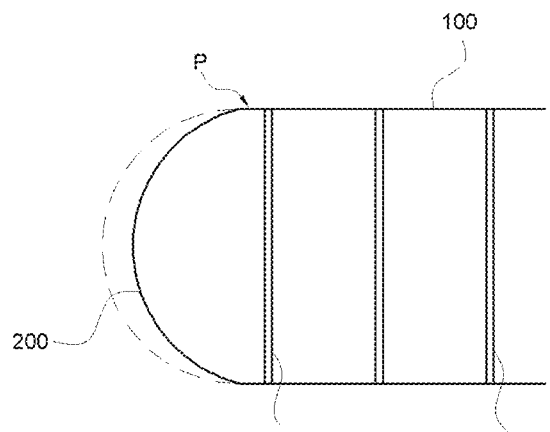
(a)
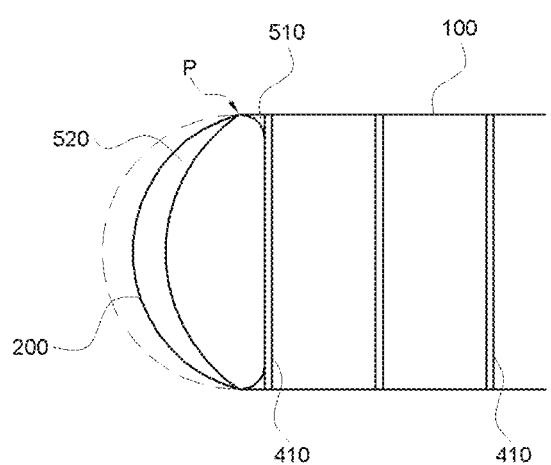
(b)
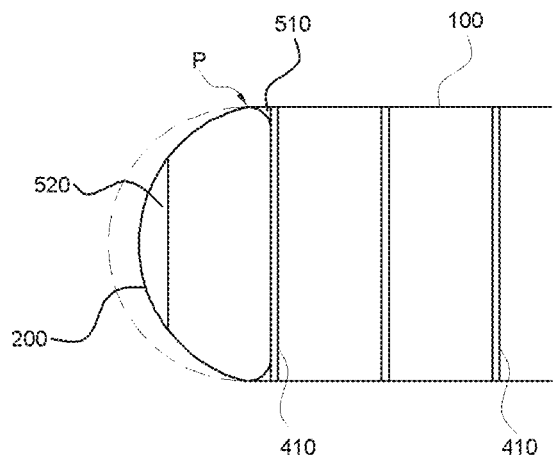
(c)

[FIG. 9]
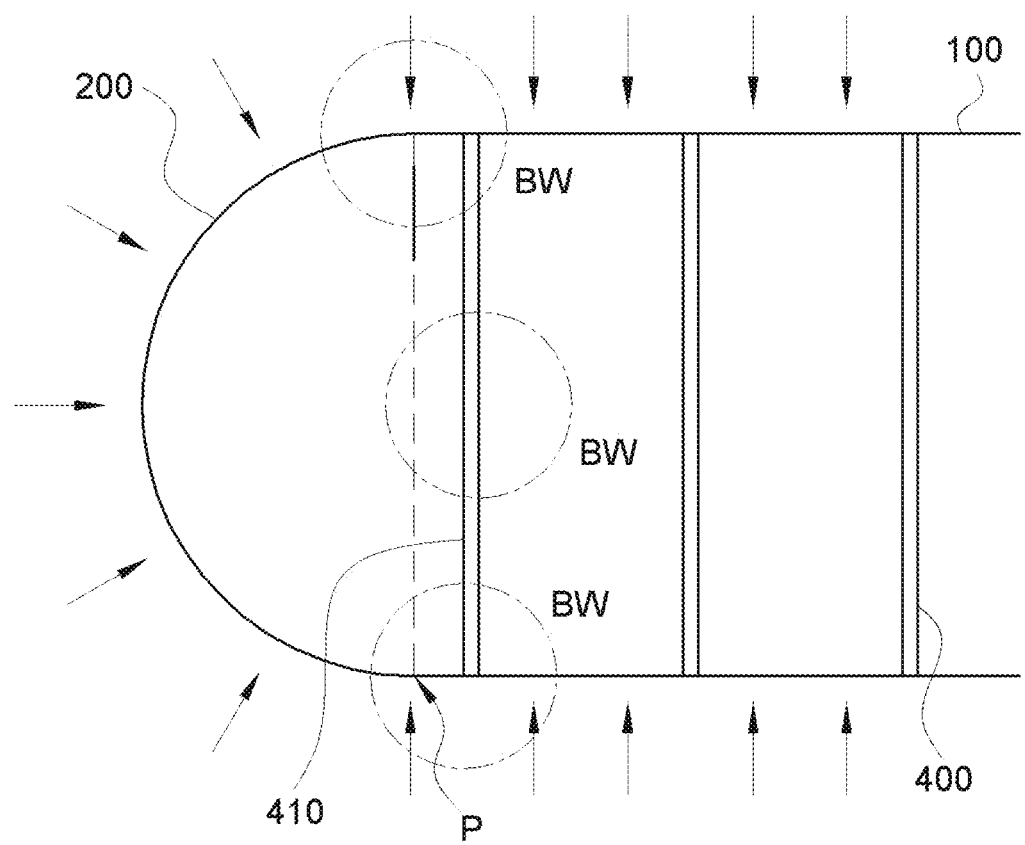

[FIG. 10]
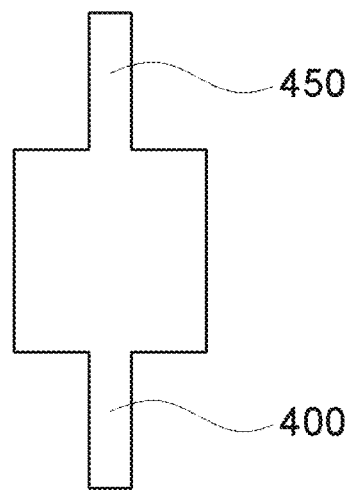
(a)
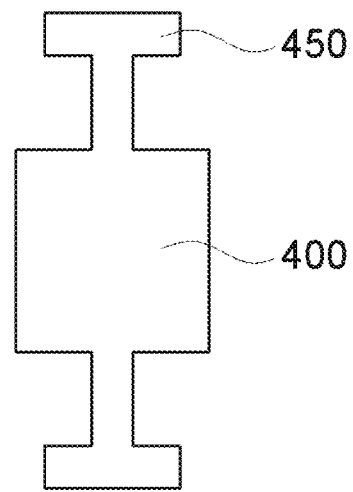
(b)
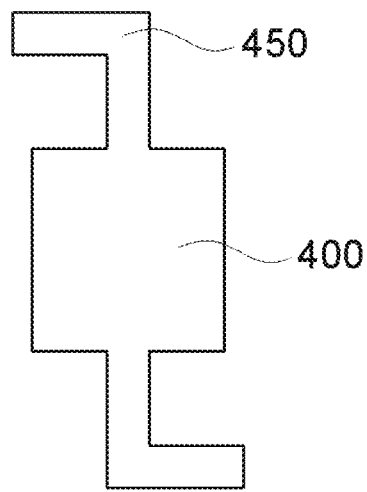
(c)
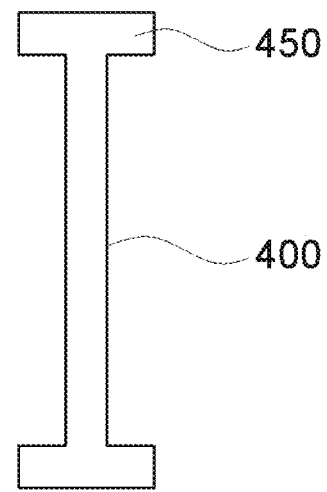
(d)

[FIG. 11]
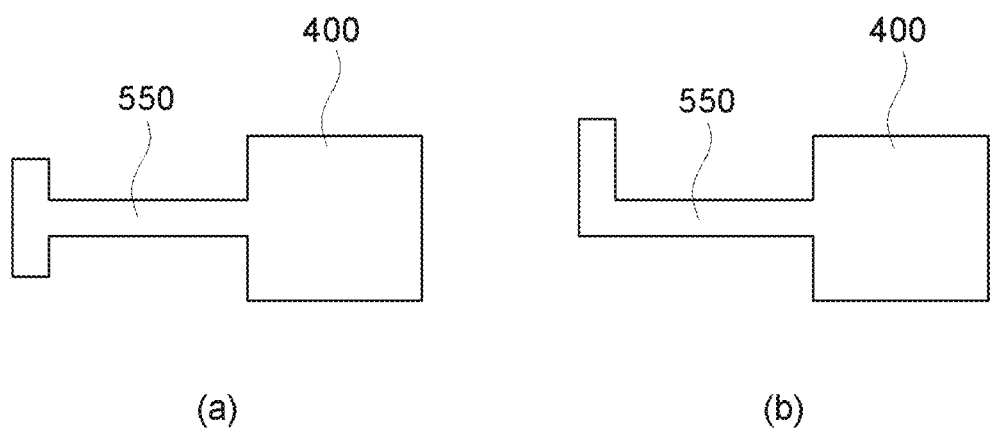
(a)  (b)

[FIG. 12]
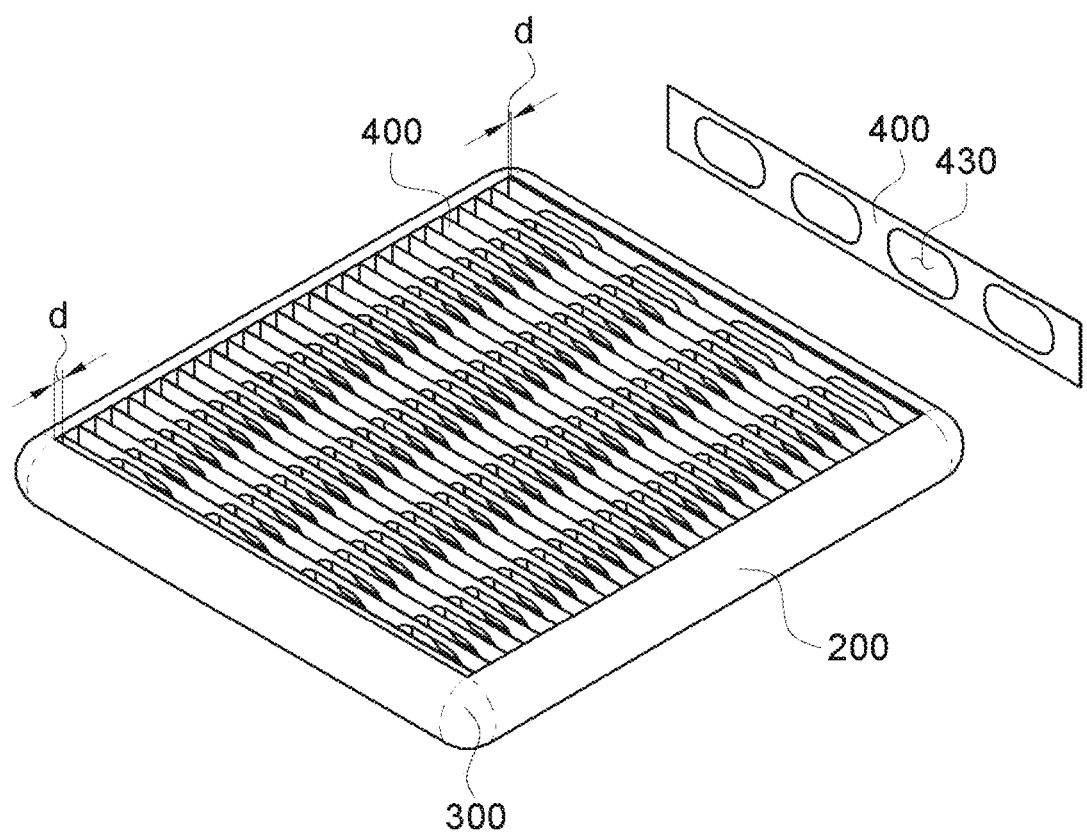

[FIG. 13]
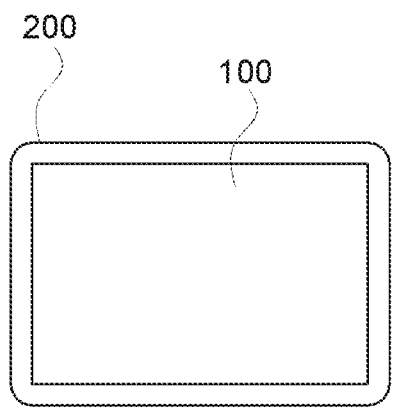
(a)
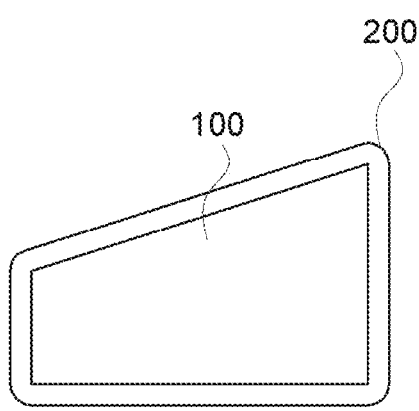
(b)
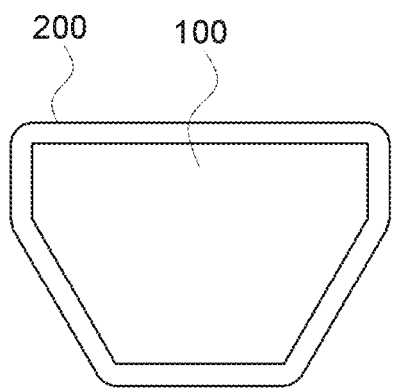
(c)
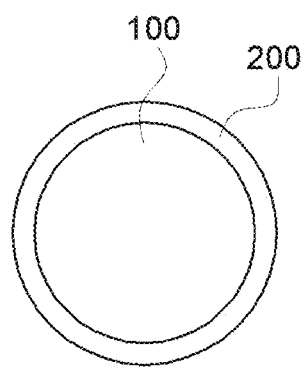
(d)

[FIG. 14]
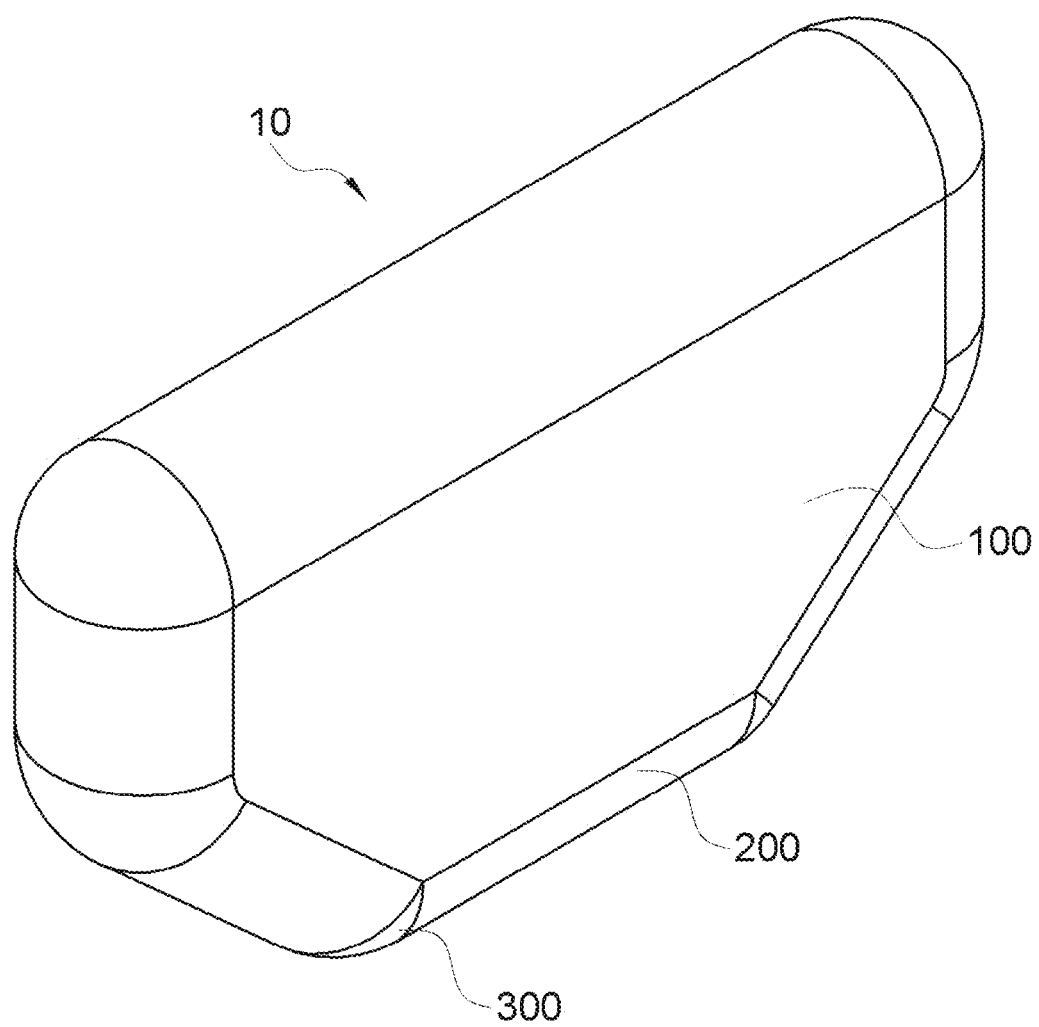

[FIG. 15]
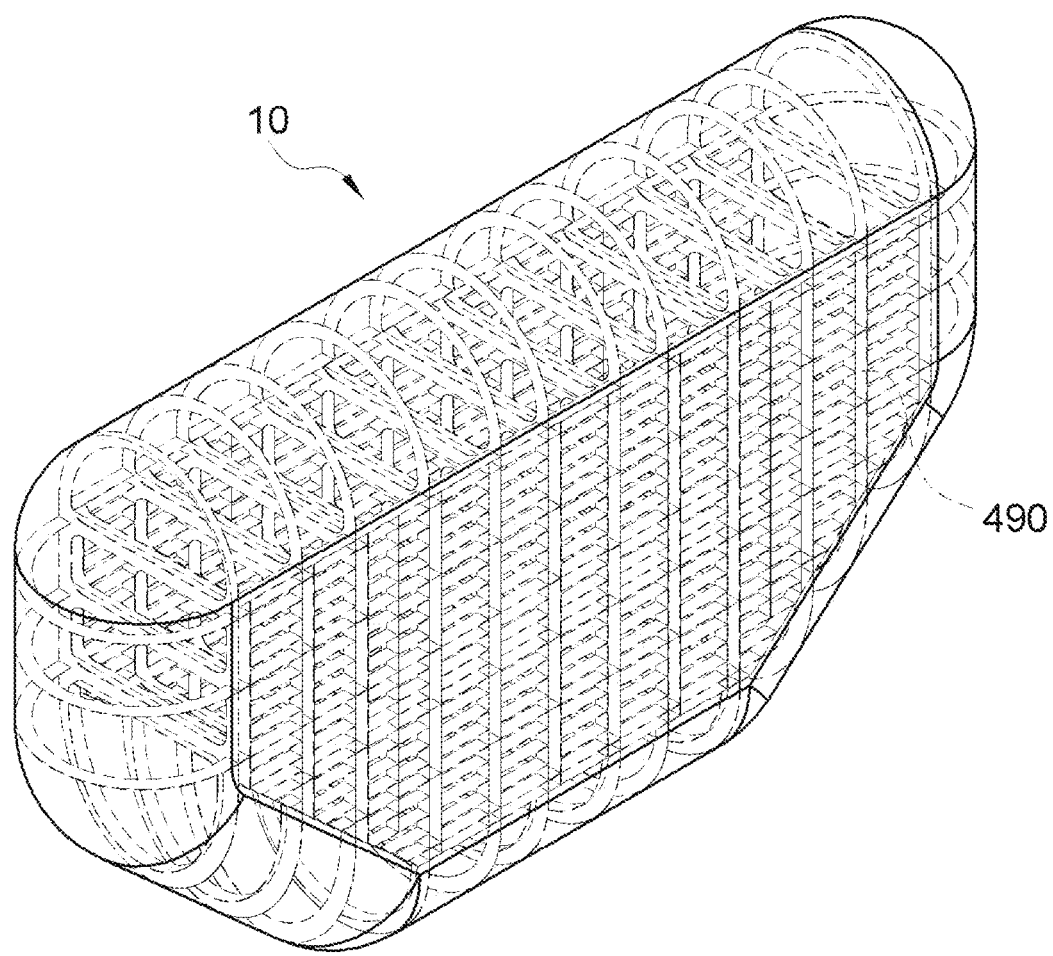

[FIG. 16]
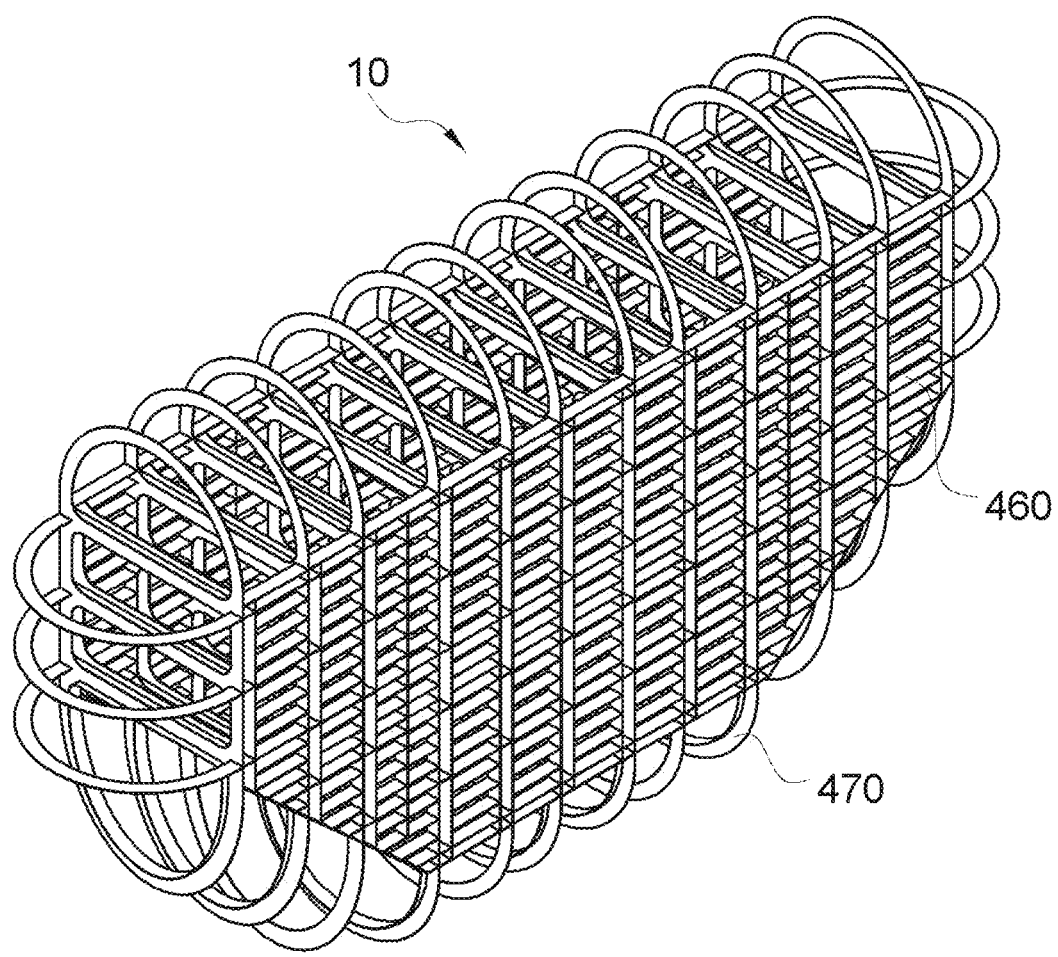

[FIG. 17]
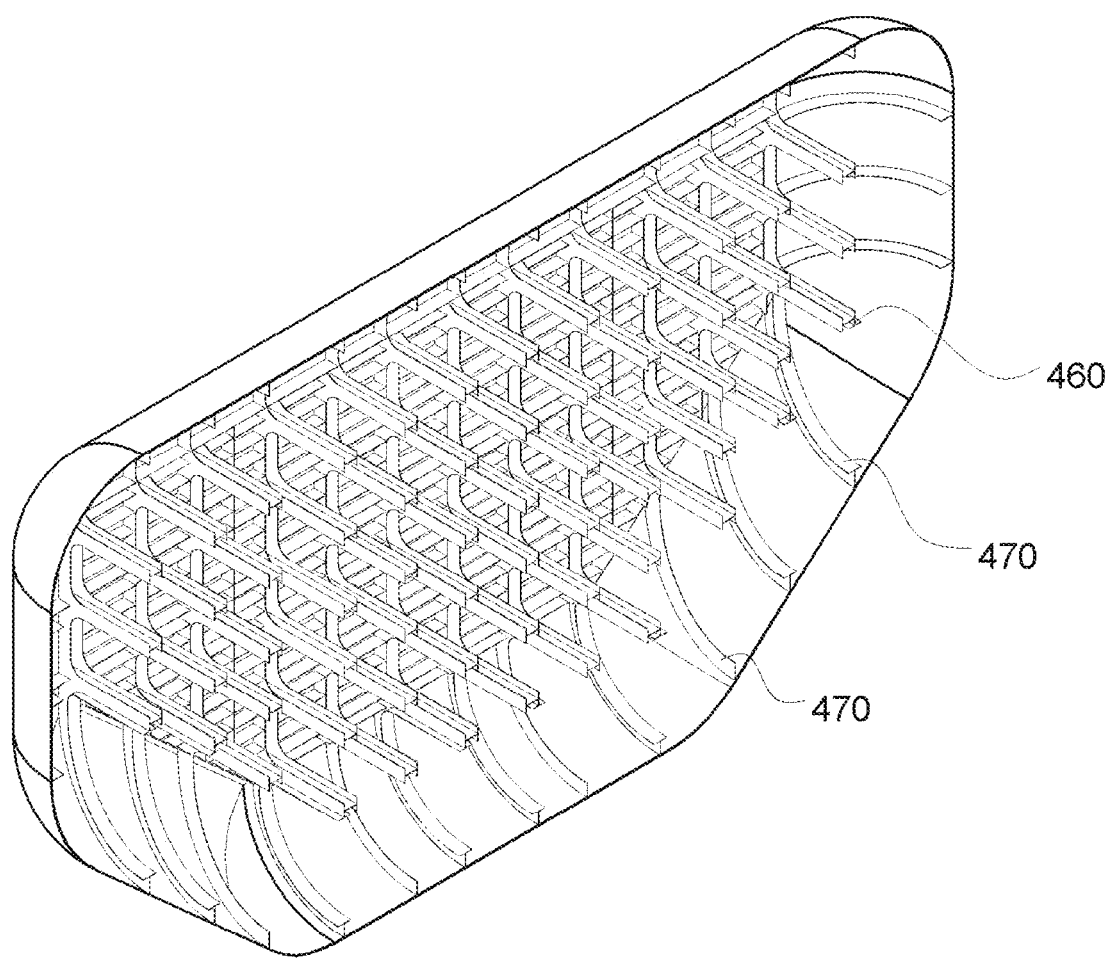

[FIG. 18]
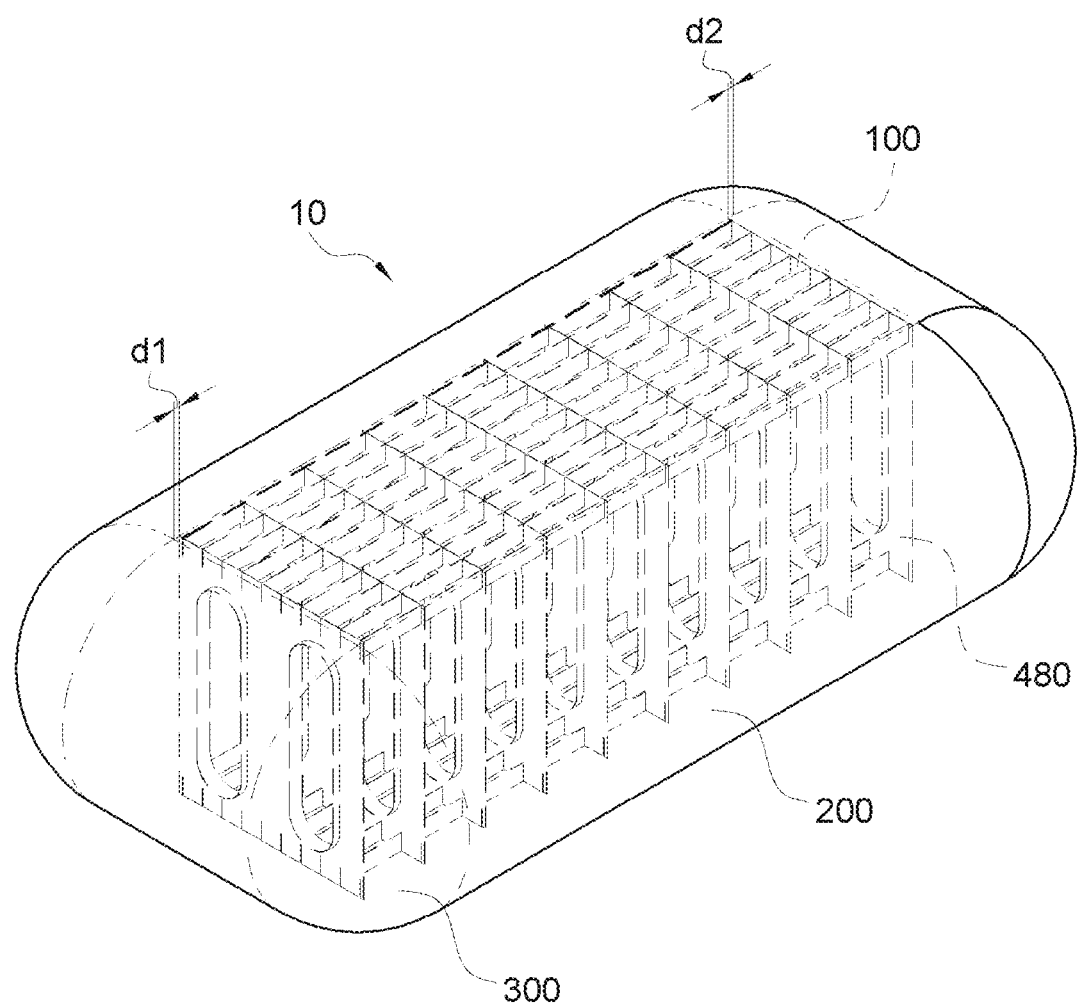

[FIG. 19]
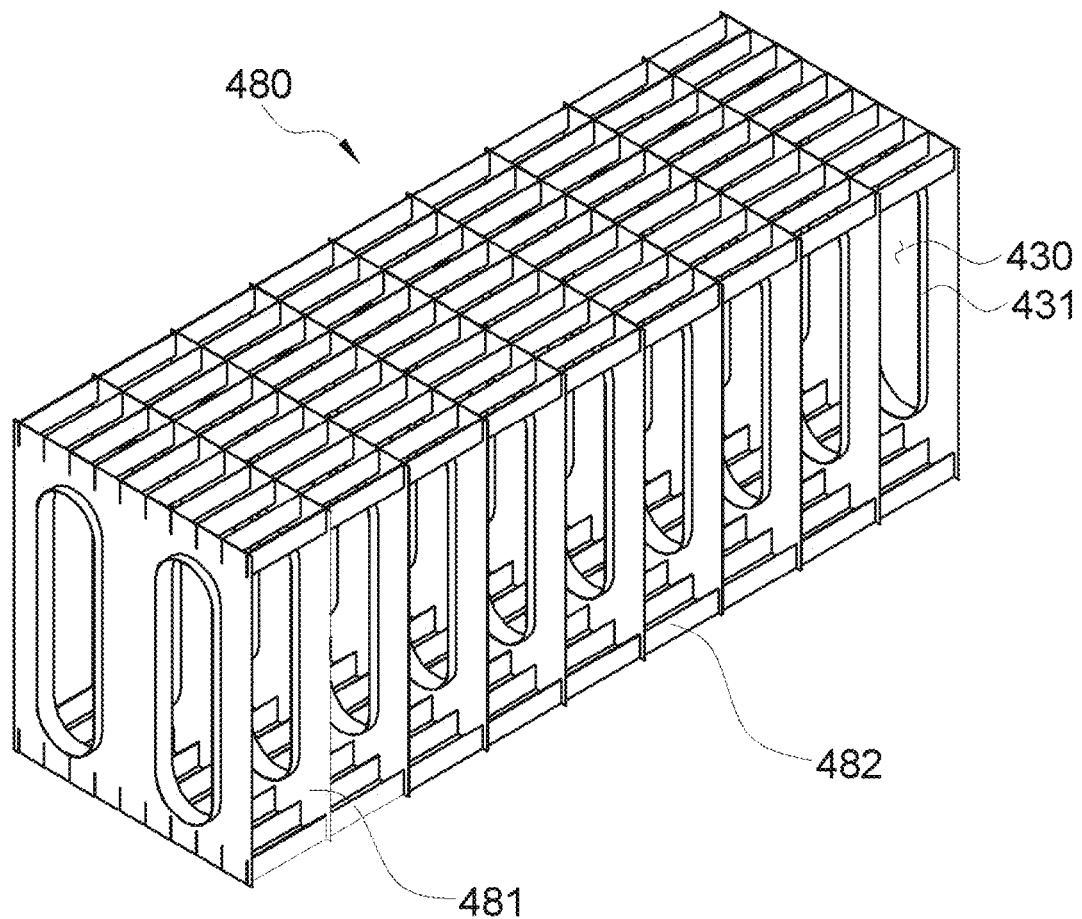

[FIG. 20]
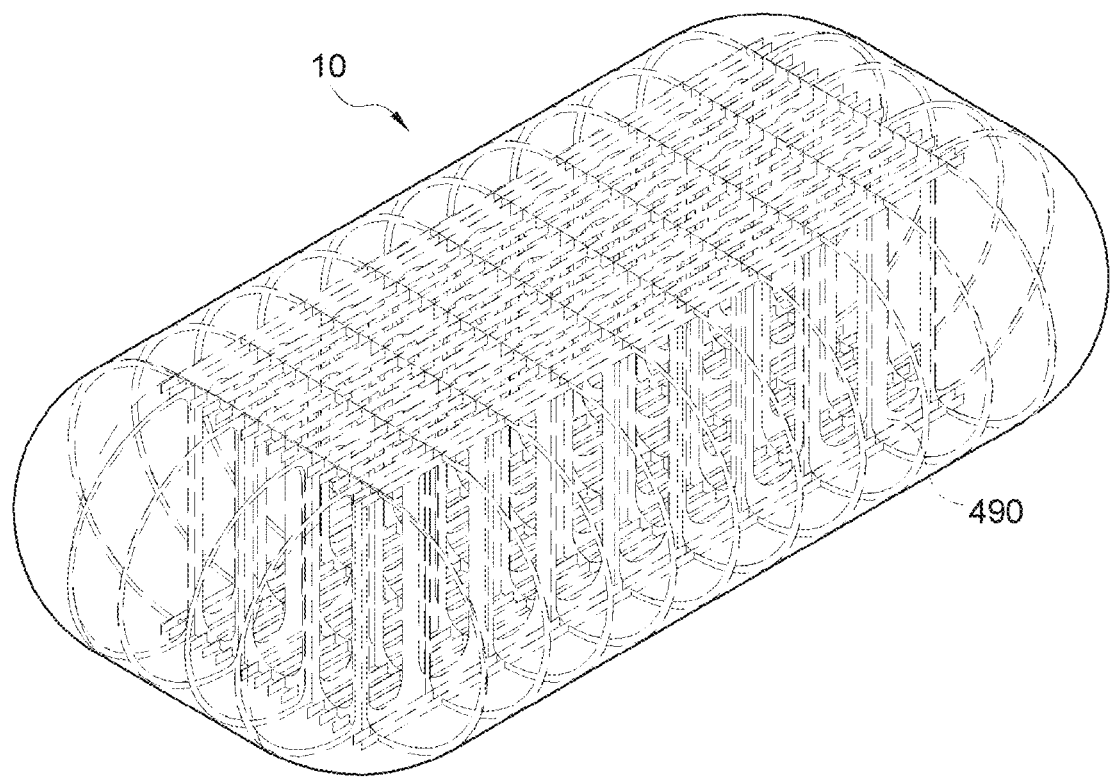

[FIG. 21]
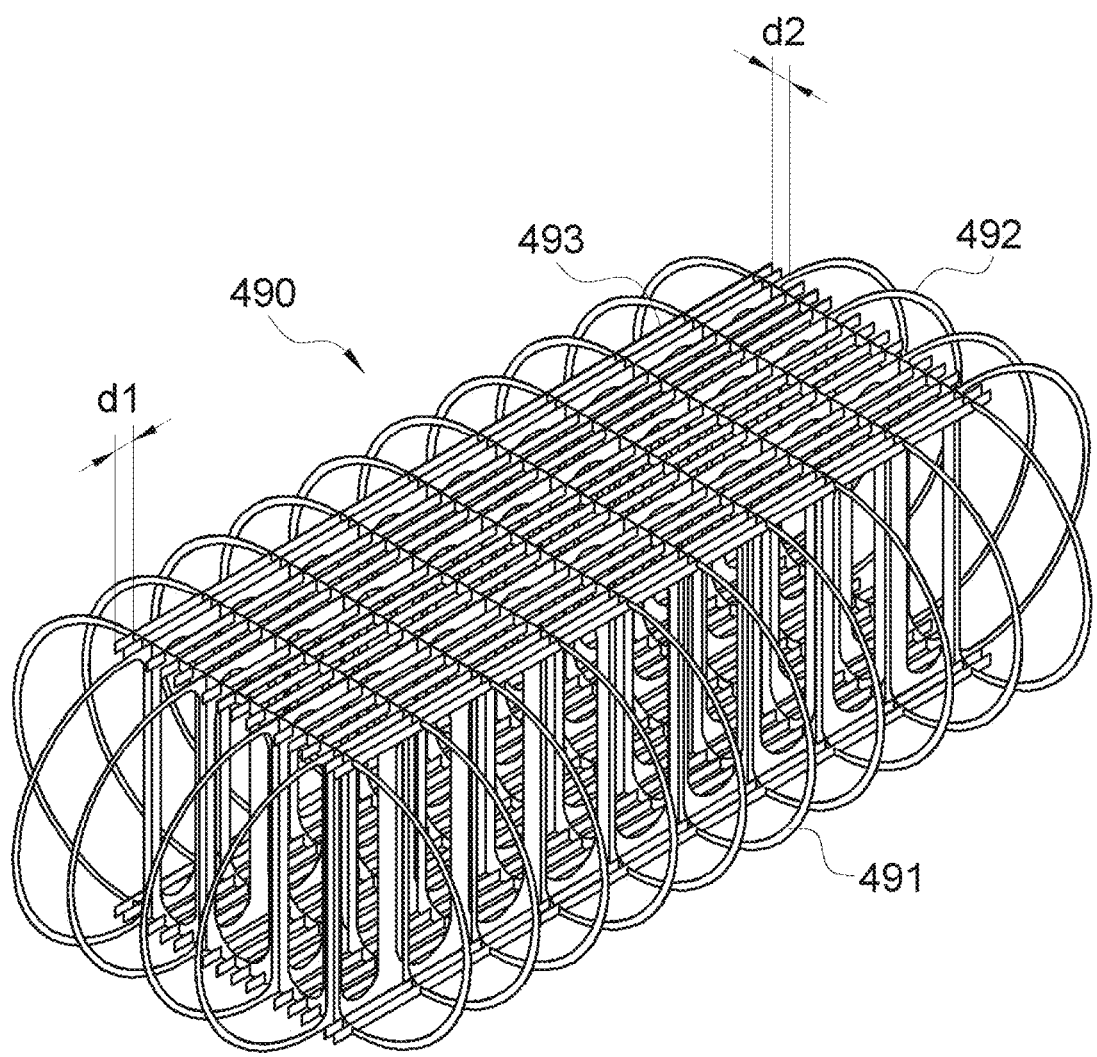

[FIG. 22]
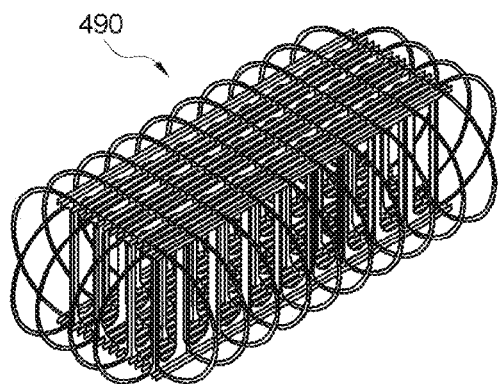
(a)
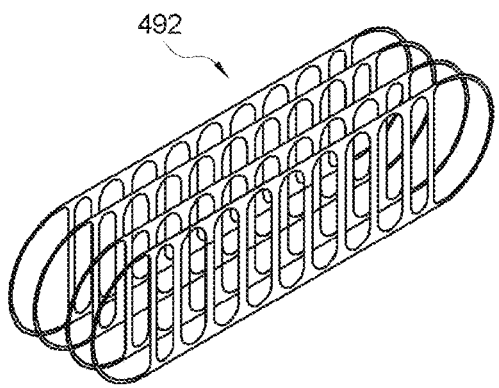
(b)
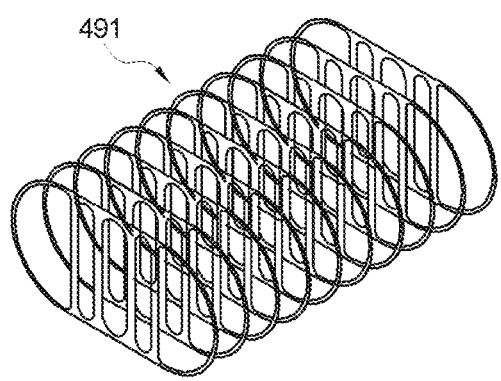
(c)
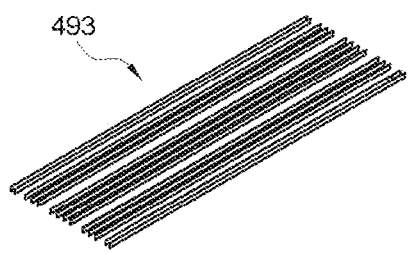
(d)

[FIG. 23]
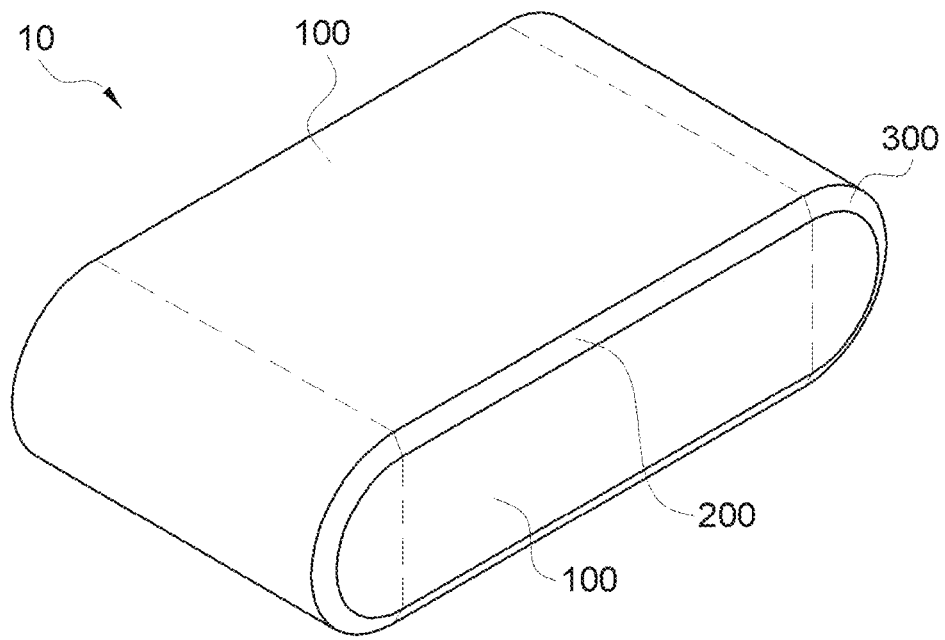
(a)
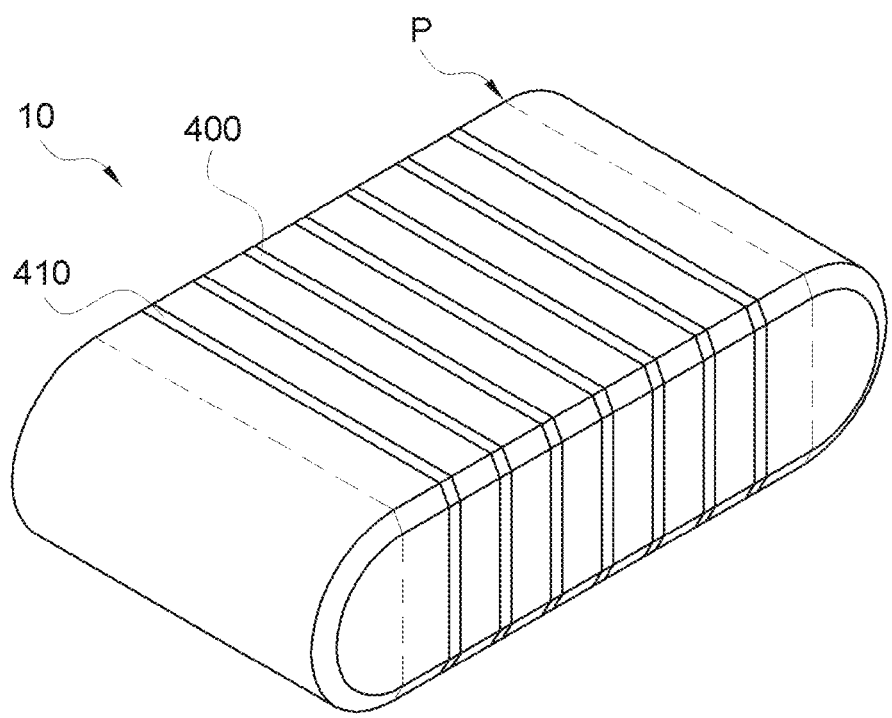
(b)

[FIG. 24]
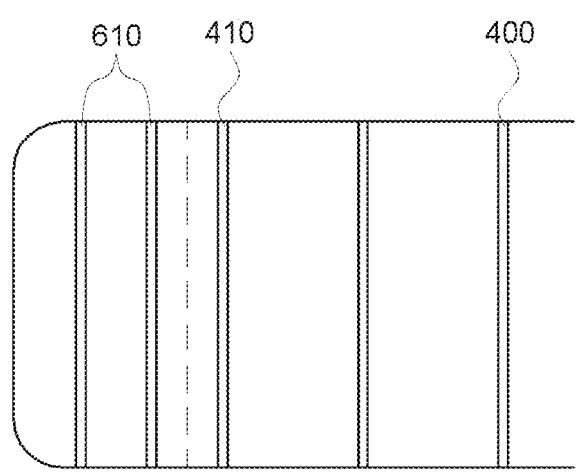
(a)
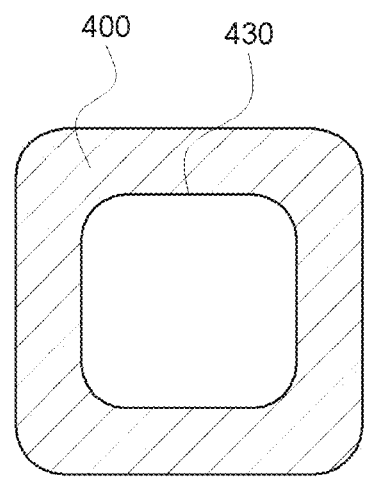
(c)
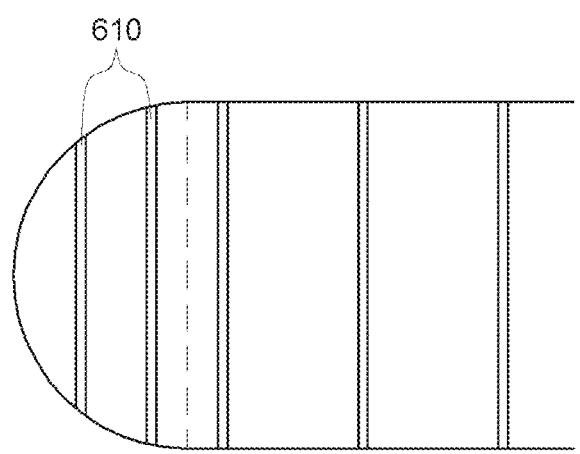
(a)
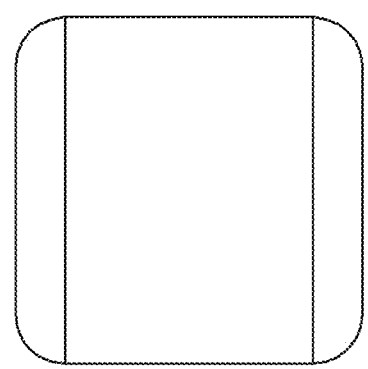
(d)

[FIG. 25]
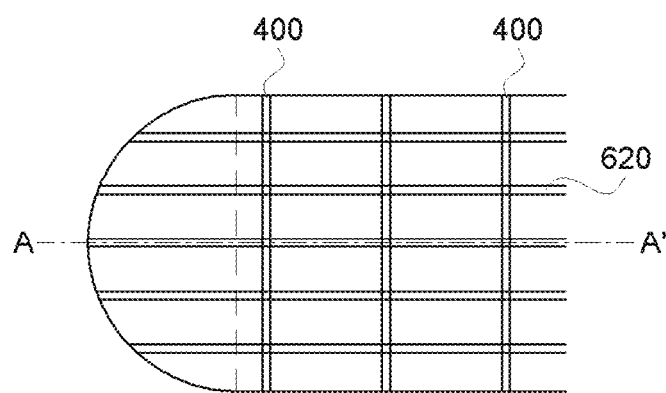
(a)
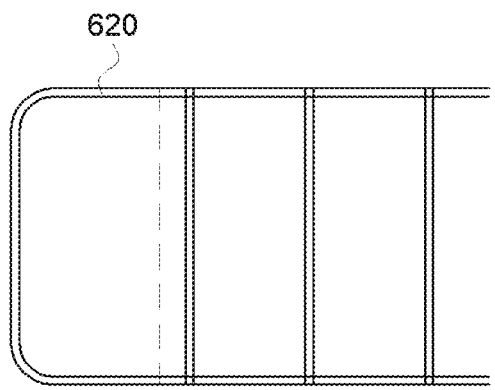
(b)
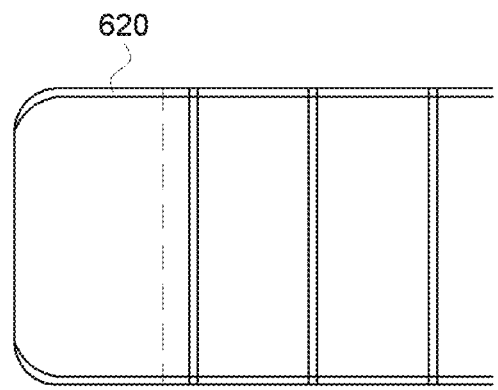
(c)

CURVE-COMBINED SQUARE PRESSURE TANK

RELATED APPLICATIONS

The present application is a divisional of U.S. application Ser. No. 16/080,181, filed Dec. 11, 2018, which is a National Phase of International Application Number PCT/KR2017/002153, filed Feb. 27, 2017, which claims the priority of Korea Application No. 10-2016-0023008, filed Feb. 26, 2016.

TECHNICAL FIELD

The present invention relates to a square pressure tank and, more particularly, to a curve-combined square pressure tank that is formed by combining a flat plate and a curved surface to enhance space utilization and reduce a weight as well as to maintain high internal pressure.

BACKGROUND ART

In general, natural gas is supplied in the form of pipe-line natural gas (PNG) that is fed to a consumption place from a production place through a pipe line or in the form of liquefied natural gas (LNG) that is liquefied through a vessel when a production place and a consumption place are far from each other and, in this case, LNG is used directly as fuel of transportation such as a vessel, a bus, and an automobile as well as general uses of liquefied natural gas and, to this end, LNG is generally stored in a cylindrical pressure tank and is stored and used in a pressure tank installed in transportation.

A general cylindrical pressure tank is conveniently used in an automobile or the like due to high pressure-resistant performance and a small volume but, when a large amount of liquefied natural gas is required like in a vessel, a plurality of cylindrical pressure tanks needs to be installed and, in particular, when liquefied natural gas is also used as fuel of a vessel, more cylindrical pressure tanks need to be installed in the vessel and, thus, there is a problem in that a space occupied in the vessel is excessively increased due to an interval between the cylindrical pressure tanks when the plurality of cylindrical pressure tanks are arranged.

When a cylindrical pressure tank is installed in a bus and an automobile, an installation space is limited due to its shape, thereby degrading space utilization.

To overcome the problem, a membrane or circular tank system, but not a cylindrical tank system, has been developed and Korean Patent Publication No. 10-1254788 discloses a square pressure tank configured by improving defects of the membrane or circular tank system, like in FIG. 1 of the present application.

The square pressure tank advantageously and largely improves space efficiency, which is disadvantage of the conventional membrane or circular tank system, but it is required to overcome a problem in terms of its high weight.

DISCLOSURE

Technical Problem

An object of the present invention is to provide a curve-combined square pressure tank for reducing a weight while enhancing space efficiency as well as maintaining high pressure inside the pressure tank.

Another object of the present invention is to provide a method of overcoming a structural problem when a square pressure tank and a curved surface are combined.

In particular, a structural alternative is provided to enhance pressure-resistant performance and to prevent buckling.

In addition, various embodiments of a curve-combined square pressure are proposed to provide an ideal model of a curve-combined square pressure tank applicable to an actual vessel.

Technical Solution

In one general aspect, a pressure tank according to the present invention includes: flat members disposed at upper and lower portions of the pressure tank; a first curved member that connects edges of the flat member disposed at the upper portion and the flat member disposed at the lower portion and is formed with predetermined curvature; and a second curved member connecting neighboring curved edges of the first curved member.

In this case, a stress-buffer portion for preventing stress discontinuity may be formed at a connection portion between the flat member and the first curved member.

The curve-combined square pressure tank according to the present invention may include a plurality of tension members disposed between the flat member disposed at the upper portion and the flat member disposed at the lower portion, and the outermost tension member among the plurality of tension members may be spaced apart from an edge at which the first curved member and the flat member contact each other by a constant distance toward the flat member to form the stress-buffer portion.

The curve-combined square pressure tank according to the present invention may include a plurality of tension members disposed between the flat member disposed at the upper portion and the flat member disposed at the lower portion, and the outermost tension member among the plurality of tension members may be coupled to an edge at which the first curved member and the flat member contact each other and is formed to be thinner than a tension member disposed inward to form the stress-buffer portion.

The curve-combined square pressure tank according to the present invention may include a plurality of tension members disposed between the flat member disposed at the upper portion and the flat member disposed at the lower portion, and the outermost tension member among the plurality of tension members may be coupled to an edge at which the first curved member and the flat member contact each other and is curved with predetermined curvature in an opposite direction to the first curved member or is formed with a bent portion that is bent in an opposite direction to the first curved member, to form the stress-buffer portion.

In this case, the outermost tension member among the plurality of tension members may include a connection reinforcing member that extends to the first curved member.

The connection reinforcing member may have one end that contacts the outermost tension member and the other end that extends to a curved portion of the first curved member.

The connection reinforcing member may be a circular connection reinforcing member formed along a curved surface of the first curved member.

The circular connection reinforcing member of the connection reinforcing member may have a height that is lowered toward the center of the first curved member.

The first curved member may have a greater radius of curvature than ½ of a distance between the flat member disposed at the upper portion and the flat member disposed at the lower portion.

A circular connection reinforcing member may be formed at the center of the first curved member.

The connection reinforcing member according to the present invention may be a T-shape or L-shape reinforcing member.

The tension member may be a tension beam, a tension plate, or a combination thereof.

A reinforcing member according to the present invention may be added to a lateral surface of the tension member.

The reinforcing member added to the lateral surface of the tension member may be a 1-shape, T-shape, or L-shape reinforcing member.

A shape of the flat member viewed from an upper portion thereof may be a rectangular shape, an asymmetrical shape with different facing surfaces, a trapezoidal shape, a polygonal shape with one narrow side, or a circular shape.

The flat member may have a polygonal shape and may be formed in such a way that one of the facing sides is shorter than the other side.

An internal grid structure including a grid reinforcing member that is formed in grid patterns by arranging a plurality of H-type beams perpendicularly to each other and a plurality of ring-type reinforcing members that extend from a portion of the H-type beams and are coupled to an internal side of the adjacent first curved member with predetermined curvature, may be disposed between the flat members.

The outermost H-type beam among the plurality of H-type beams may be disposed in the tank to be spaced apart from an edge connected between the flat member and the first curved member by a constant distance and some of the plurality of ring-type reinforcing members may have a T-shape sectional view.

A grid-type reinforcing structure including flat plate-type reinforcing members having hollow portions and linear-type reinforcing members for connecting the flat plate-type reinforcing members may be disposed between the flat members.

A reinforcing flange may be formed on an outer periphery of the hollow portion.

A plurality of horizontal grid plates and a plurality of vertical grid plates, each of which includes a reinforcing ring formed therein, may cross each other between the flat members and, as necessary, an internal grid structure including a plurality of linear-type reinforcing members disposed therein may be disposed between the horizontal grid plates or the vertical grid plates.

The curve-combined square pressure tank may include one or more pairs of flat members.

In this case, cross frames for connection between lateral end portions may each be disposed in up and down directions at the lateral end portions of the pair of flat members.

A plurality of parallel plates may be stacked in up and down directions and opposite ends of the parallel plate may extend up to the curved member.

The parallel plate may be formed with a uniform thickness perpendicularly to a lateral flat member and may be formed to surround an internal portion of the curved member.

The parallel plate may be formed with a uniform thickness perpendicularly to the lateral flat member and may be formed only up to an edge of a flat member.

Advantageous Effects

A curve-combined square pressure tank according to the present invention may advantageously reduce space utilization and a weight as well as maintaining high internal pressure.

When the curve-combined square pressure tank is manufactured, imbalance of internal stress applied to a connection portion between a curved surface and a flat surface may be advantageously overcome to enhance pressure-resistant performance.

When the curve-combined square pressure tank is manufactured, the connection portion between the curved surface and the flat surface may be advantageously prevented from buckling due to external load applied to the connection portion.

DESCRIPTION OF DRAWINGS

FIG. 1 is a diagram showing a conventional square pressure tank.

FIG. 2 is a perspective view of a curve-combined square pressure tank according to the present invention.

FIG. 3 is a schematic diagram showing a problem in terms of internal pressure of a curve-combined square pressure tank.

FIG. 4 illustrates a cross sectional shape of a curve-combined square pressure tank according to the present invention.

FIG. 5 is a schematic diagram showing a principle for overcoming the first object of a curve-combined square pressure tank according to the present invention.

FIG. 6 is a schematic diagram showing Embodiment 1-1 and modified embodiments thereof for the first object of the present invention in a curve-combined square pressure tank according to the present invention.

FIG. 7 is a schematic diagram showing Embodiment 1-2 and modified embodiments thereof for the first object of the present invention in the curve-combined square pressure tank.

FIG. 8 is a schematic diagram showing Embodiment 1-3 and modified embodiments thereof for the first object of the present invention in the curve-combined square pressure tank.

FIG. 9 is a schematic diagram showing a problem in terms of buckling of a curve-combined square pressure tank.

FIG. 10 is a schematic diagram showing Embodiment 2-1 and modified embodiments thereof for a second object of the present invention in the curve-combined square pressure tank.

FIG. 11 is a schematic diagram showing Embodiment 2-2 and modified embodiments thereof for the second object of the present invention in the curve-combined square pressure tank.

FIG. 12 is a perspective view of a curve-combined square pressure tank including a tension plate formed therein.

FIG. 13 is a schematic diagram showing a shape of a curve-combined square pressure tank according to the present invention viewed in the Z-axis direction and a modified embodiment.

FIG. 14 is a perspective view of another modified embodiment of a curve-combined square pressure tank according to the present invention.

FIG. 15 is a perspective view of an internal grid structure according to another modified embodiment of a curve-combined square pressure tank according to the present invention.

FIG. 16 is a perspective view of an internal grid structure according to another modified embodiment of a curve-combined square pressure tank according to the present invention.

FIG. 17 is a sectional perspective view of another modified embodiment of a curve-combined square pressure tank according to the present invention.

FIG. 18 is a perspective view of a curve-combined square pressure tank according to a third embodiment of the present invention.

FIG. 19 is a perspective view for explanation of an internal shape of the curve-combined square pressure tank according to the third embodiment of the present invention.

FIG. 20 is a perspective view of the curve-combined square pressure tank according to a modified embodiment of the third embodiment of the present invention.

FIG. 21 is a perspective view for explanation of an internal grid structure of the curve-combined square pressure tank according to a modified embodiment of the third embodiment of the present invention.

FIG. 22 is a perspective view for explanation of an internal shape of a modified embodiment of the third embodiment of the present invention.

FIG. 23 is a perspective view of a curve-combined square pressure tank according to a fourth embodiment of the present invention.

FIG. 24 is a schematic diagram showing a technical solution of the curve-combined square pressure tank according to the fourth embodiment of the present invention.

FIG. 25 is a schematic diagram showing another technical solution of the curve-combined square pressure tank according to the fourth embodiment of the present invention.

BEST MODE

A pressure tank according to the present invention may include flat members disposed at upper and lower portions of the pressure tank, a first curved member that connects the flat member disposed at the upper portion and an edge of the flat member disposed at the lower portion and is formed with predetermined curvature, and a second curved member connecting neighboring curved edges of the first curved member and, in this case, a stress-buffer portion for preventing stress discontinuity may be formed at a connection portion between the flat member and the first curved member.

The curve-combined square pressure tank according to the present invention may include a plurality of tension members disposed between the flat member disposed at the upper portion and the flat member disposed at the lower portion, and the outermost tension member among the plurality of tension members may be spaced apart from an edge at which the first curved member and the flat member contact each other by a constant distance toward the flat member to form a stress-buffer portion.

The curve-combined square pressure tank according to the present invention may include a plurality of tension members disposed between the flat member disposed at the upper portion and the flat member disposed at the lower portion, and the outermost tension member among the plurality of tension members may be coupled to an edge at which the first curved member and the flat member contact each other and is formed to be thinner than a tension member disposed inward to form a stress-buffer portion.

The curve-combined square pressure tank according to the present invention may include a plurality of tension members disposed between the flat member disposed at the upper portion and the flat member disposed at the lower portion, and the outermost tension member among the plurality of tension members may be coupled to an edge at which the first curved member and the flat member contact each other and is curved with predetermined curvature in an opposite direction to the first curved member or is formed with a bent portion that is bent in an opposite direction to the first curved member, to form a stress-buffer portion.

In this case, the outermost tension member among the plurality of tension members may include a connection reinforcing member that extends to the first curved member.

The connection reinforcing member may have one end that contacts the outermost tension member and the other end that extends to a flat portion of the first curved member.

A shape of the flat member viewed from an upper portion thereof may be a rectangular shape, an asymmetrical shape with different facing surfaces, a trapezoidal shape, a polygonal shape with one narrow side, or a circular shape.

The flat member may have a polygonal shape and may be formed in such a way that one of facing sides is shorter than the other side.

An internal grid structure including a grid reinforcing member that is formed in grid patterns by arranging a plurality of H-type beams perpendicularly to each other and a plurality of ring-type reinforcing members that extend from a portion of the H-type beams and are coupled to an internal side of the adjacent first curved member with predetermined curvature, may be disposed between the flat members.

A grid-type reinforcing structure including flat plate-type reinforcing members having hollow portions and linear-type reinforcing members for connecting the flat plate-type reinforcing members may be disposed between the flat members.

A plurality of horizontal grid plates and a plurality of vertical grid plates, each of which includes a reinforcing ring formed therein, may cross each other between the flat members and, as necessary an internal grid structure including a plurality of linear-type reinforcing members disposed therein may be disposed between the horizontal grid plates or the vertical grid plates.

The curve-combined square pressure tank may include one or more pairs of flat members.

In this case, cross frames for connection between lateral end portions may each be disposed in up and down directions at the lateral end portions of the pair of flat members.

A plurality of parallel plates may be stacked in up and down directions and opposite ends of the parallel plate may extend up to the curved member.

The parallel plate may be formed with a uniform thickness perpendicularly to a lateral flat member and may be formed to surround an internal portion of the curved member.

The parallel plate may be formed with a uniform thickness perpendicularly to a lateral flat member and may be formed only up to an edge of a flat member.

MODE FOR INVENTION

Hereinafter, a curve-combined square pressure tank 10 having the above features is described in detail with reference to the accompanying drawings. The following descriptions are merely examples shown for explanation of some embodiments of the present invention, but not for being limited to a specific embodiment.

FIG. 2 is a perspective view showing an outer appearance of the curve-combined square pressure tank 10 according to the present invention. As shown in the drawing, the curve-combined square pressure tank 10 according to the present invention may include a pair of flat members 100, a plurality of first curved members 200 that connect facing edges of the pair of flat members 100, and a plurality of second curved members 300 that connect neighboring edges of the plurality of first curved members 200.

In general, a cylindrical pressure tank with an external curved surface may be maintained at predetermined internal pressure only by a thickness of the pressure tank without a special reinforcing structure therein, but the square pressure tank has a limit in maintaining internal pressure only by the flat member 100 and, thus, the flat members 100 need to be connected by a tension member 400 such as a tension beam or a tension plate to satisfy pressure-resistant performance.

However, when the tension member 400 is installed in a pressure tank obtained by combining a curved surface and a flat surface, bending stress is applied to the flat member 100 and membrane stress is applied to the curved member 200 as shown in FIG. 3A, and stress discontinuity occurs at a connection portion between the flat member 100 and the curved member 200 as shown in FIG. 3B and, thus, there is a problem in that pressure-resistant performance of the pressure tank is remarkably degraded.

FIG. 4 illustrates a cross sectional shape of the curve-combined square pressure tank 10 according to the present invention along the Y axis to overcome the above problem. A position of the outermost tension member 410 that is installed to be closest to the curved member 200 among the plurality of tension members 400 may be determined as a position spaced apart from the curved member by a constant distance toward the flat member 100, but not a boundary between the flat member 100 and the curved member and, thus, a stress-buffer portion for preventing stress discontinuity may be formed.

FIG. 5 is a schematic diagram showing a principle for overcoming stress discontinuity, which corresponds to the first object of the present invention. A position of the outermost tension member 410 that is installed to be closest to the curved member 200 among the plurality of tension members 400 may be determined as a position spaced apart from the curved member by a constant distance toward the flat member, but not a boundary between the flat member 100 and the curved member and, thus, stress discontinuity generated at the boundary between the flat member 100 and the curved member 200 may be reduced.

FIG. 6 is a schematic diagram showing Embodiment 1-1 and modified embodiments thereof for the first object of the present invention in the curve-combined square pressure tank 10 according to the present invention. In FIG. 6A, the outermost tension member 410 may be disposed at a connection portion between the flat member 100 and the curved member and the outermost tension member 410 may have a smaller thickness than that of the other tension members 400 disposed inside the square pressure tank 10, thereby achieving a stress balancing effect that is similar to the case in which a stress-buffer portion with a predetermined region is formed at an end portion of the flat member 100. As other modified embodiments, as shown in FIG. 6B, the outermost tension member 410 may be curved in an opposite direction to the curved member 200 and, as shown in FIG. 6C, the outermost tension member 410 may be formed like a 'U' shape or an angular 'U' shape with a curved portion.

FIG. 7 is a schematic diagram showing Embodiment 1-2 and modified embodiments thereof for the first object of the present invention in the curve-combined square pressure tank 10 and, here, a connection reinforcing member 500 for connection between the outermost tension member 410 and the curved member 200 is added. The connection reinforcing member 500 may be shaped like an arced connection reinforcing member 510 that is formed at only a portion of the curved member 200 as shown in FIG. 7A, or a circular connection reinforcing member 520 that is formed at an entire portion of the curved member 200 as shown in FIG. 7B and, in this case, the connection reinforcing member 500 may be shaped like the circular connection reinforcing member 520 that is thinned toward a central portion of a curved portion as shown in FIG. 7C.

FIG. 8 is a schematic diagram showing Embodiment 1-3 and modified embodiments thereof for the first object of the present invention in the curve-combined square pressure tank 10. As shown in FIG. 8A, when curvature of a flat portion is increased to enhance space efficiency, much higher stress may be applied to a central portion of the curved portion than a cylindrical tank with small curvature. In Embodiment 1-3 as a method of overcoming this, the circular connection reinforcing member 520 may be thickened toward a central portion of the curved portion as shown in FIG. 8B and, as another modified embodiment, the separate circular connection reinforcing member 520 may be formed only at the central portion of the curved portion as shown in FIG. 8C.

Differently from a cylindrical pressure tank, an entire external surface of which is formed with a curved surface, a problem in terms of buckling needs to be overcome in the case of a pressure tank including the flat member 100 as shown in FIG. 9. In particular, an end of the curved member 200, adjacent to the outermost tension member 410, and the outermost tension member 410 may be a portion BW that is vulnerable with respect to buckling.

FIGS. 10 and 11 are schematic diagrams showing an embodiment and a modified embodiment for the second object of the present invention in the curve-combined square pressure tank 10 according to the present invention and, here, as a method of overcoming the second object, according to the present invention, a reinforcing member may be added to a lateral surface of a tension beam that is an example of the tension member 400.

FIG. 10 is a diagram showing an embodiment and a modified embodiment of a cross sectional shape of a tension beam for preventing buckling. 1-shape reinforcing members 450 shown in FIG. 10A, T-shape reinforcing members 450 shown in FIG. 10B, or L-shape reinforcing members 450 shown in FIG. 10C may be added to facing lateral surfaces of the tension beam, or the tension beam may be formed with a H-shape sectional view as shown in FIG. 10D. The shape of the tension beam reinforcing member 450 is not limited to the above embodiments and may be modified in various ways.

FIG. 11 is a diagram showing an embodiment and a modified embodiment of a cross sectional shape of the connection reinforcing member 500 for preventing buckling. As shown in FIG. 11A, the connection reinforcing member 500 may be formed with a T-shape sectional view or, as shown in FIG. 11B, may be formed with an L-shape sectional view. The cross sectional shape of the connection reinforcing member 500 for preventing buckling is not limited to the above embodiment and may be modified in various ways.

As described above, the curve-combined square pressure tank according to the present invention may be configured in such a way that discontinuity of internal pressure is overcome by thinning the tension member 400 to overcome a problem in terms of tension stress and, simultaneously, section modulus is increased by forming a reinforcing member in the tension beam to simultaneously overcome a problem in terms of compression stress.

FIG. 12 shows a curve-combined square pressure tank including a tension plate formed therein instead of a tension beam, as an example of the tension member 400 and, here, similarly to a curve-combined square pressure tank including a tension beam formed therein, the outermost pressure plate may be spaced apart from a connection point between the flat member 100 and the curved member 200 by a constant distance d toward the flat member 100.

Hollow portions 430 may be formed in the tension plate, liquefied natural gas (LNG) may be moved in the tank through the hollow portions 430 and, during manufacture of the tank, the hollow portions 430 may function as a path through which a worker moves.

The aforementioned additional method for enhancing the effect of preventing discontinuity of internal pressure may also be applied to the outermost tension plate and, as shown in FIG. 7, the outermost tension plate may be thinned or may be formed with a curved shape or a U-shape.

In addition, the connection reinforcing member 500 for connection between the outermost tension plate and a portion of the curved member may be added and, as shown in FIG. 8, the connection reinforcing member 500 may be shaped like an arced connection reinforcing member that is formed at only a portion of the curved member or a circular connection reinforcing member that is formed at an entire portion of the curved member, or the connection reinforcing member 500 may be thinned toward a central portion of the curved portion.

The aforementioned additional method for preventing buckling may also be applied to the outermost tension plate and, as shown in FIGS. 10 and 11, a reinforcing member with various cross sectional shapes may be added to the outermost tension plate and the connection reinforcing member 500 to enhance the effect of preventing buckling.

As shown in FIG. 13, the curve-combined square pressure tank 10 according to the present invention may be formed with various shapes and, referring to FIG. 13, a shape of the curve-combined square pressure tank 10 according to the present invention viewed in the Z-axis direction, that is, a shape of the flat member 100 viewed from an upper portion thereof may be a flat rectangular shape as shown in FIG. 13A but may be an asymmetrical shape with different facing surfaces depending on a shape of a space for cumulating pressure tanks and, for example, may be a trapezoidal shape as shown in FIG. 13B, may be a polygonal shape with one narrow side as shown in FIG. 13C, may be a circular shape as shown in FIG. 13D, or may have another polygonal shape or an oval shape, or a combination thereof. In this case, a curved surface for connection between a flat plate and a straight edge of the flat plate may have a two-dimensional (2D) curved surface that is a portion of a cylindrical shape and a curved edge of the flat plate or a curved surface for connection of curved surfaces may have a three-dimensional (3D) curved surface that is a portion of a spherical shape.

FIG. 14 shows the embodiment shown in FIG. 13C in a 3D shape to aid in understanding and, here, one side with a narrow width is disposed toward a stem or a stern or is disposed downward depending on a shape of a vessel, thereby enhancing space efficiency. That is, the flat member 100 may have a polygonal shape and may be formed in such a way that one of the facing sides is shorter than the other side.

FIGS. 15 to 17 are shown for explanation of a structure of an internal grid structure 490 of the embodiment of FIG. 13C and, here, the internal grid structure 490 may include a grid reinforcing member 460 that is formed in grid patterns by arranging a plurality of H-type beams perpendicularly to each other between the flat members 100, and a plurality of ring-type reinforcing members 470 that extend from a portion of the H-type beams and are coupled to an internal side of the adjacent first curved member 200, with predetermined curvature. In this case, the outermost H-type beam among the plurality of H-type beams may be disposed in the tank to be spaced apart from an edge connected between the flat member 100 and the first curved member 200 by a constant distance and some of the plurality of ring-type reinforcing members 470 may have a T-shape sectional view.

FIGS. 18 and 19 show a curve-combined square pressure tank with a tension plate formed therein according to a third embodiment and, according to the third embodiment, a grid-type reinforcing structure 480 may be formed between the flat members 100 and may include flat plate-type reinforcing members 481 having the hollow portions 430 and linear-type reinforcing members 482 for connecting the flat plate-type reinforcing members 481. In this case, a reinforcing flange 431 may be formed on an outer periphery of the hollow portion 430.

In this case, a distance by which the outermost member is spaced apart from a boundary between the flat member 100 and the curved member 200 may be configured with different distances d1 and d2 in width and length directions, respectively.

In addition, when curvature of the curved member 200 of the curve-combined square pressure tank 10 is large, a reinforcing ring may be additionally included inside the curved member 200 to prevent influence of buckling. FIGS. 20 to 22 show a modified embodiment of the third embodiment of the curve-combined square pressure tank that additionally includes the reinforcing ring.

The reinforcing ring additionally included inside the curved member may also be applied to the aforementioned curve-combined square pressure tank with the tension beam therein as shown in FIG. 19.

This is now described in more detail with reference to FIGS. 21 and 22. In the case of the internal grid structure 490 with the reinforcing ring formed therein, a plurality of horizontal grid plates 491 and a plurality of vertical grid plates 492, each of which includes a reinforcing ring formed therein, may cross each other and, as necessary, a plurality of linear-type reinforcing members 493 may be disposed between the horizontal grid plates 491 or the vertical grid plates 492 to reinforce strength.

In this case, a distance by which the outermost member is spaced apart from a boundary between the flat member 100 and the curved member 200 may be configured with different distances d1 and d2 in width and length directions, respectively.

FIG. 22 shows the curve-combined square pressure tank 10 according to another embodiment and shows an embodiment of two pairs of flat members 100, but not a pair of flat members. The curve-combined square pressure tank 10 according to a fourth embodiment shown in FIG. 22 may be different from the aforementioned embodiment in that the fourth embodiment has the feature in which the number of curved surfaces except for edge portions is two.

Due to the above feature, there is a problem in terms of stress imbalance at the connection portion between the flat member 100 and the curved member according to the aforementioned embodiment and, also, there are a problem in terms of stress imbalance or degradation in pressure-resistant performance at a connection portion between a lateral end portion of another flat member 100 disposed on a lateral surface and a lateral surface of the curved member and a problem in terms of pressure-resistant performance of the flat member 100 at an lateral end portion that is a region connected to the curved member, as shown in FIG. 23.

FIG. 24 shows an embodiment for overcoming the above problem and, here, cross frames 610 for connection between lateral end portions may each be disposed in up and down directions to achieve an effect of overcoming stress imbalance at the lateral end portion and enhancing pressure-resistant performance. FIG. 24A shows an arrangement viewed from the above and FIG. 24B shows an arrangement viewed from the lateral aspect.

As shown in FIG. 25 according to another embodiment for overcoming the above problem, a plurality of parallel plates 620 may be stacked in up and down directions and opposite ends of the parallel plate 620 may extend up to the curved member to achieve an effect of overcoming stress imbalance at the lateral end portion and enhancing pressure-resistant performance. The parallel plate 620 may be formed with a uniform thickness perpendicularly to a lateral flat member and, may be formed to surround an internal portion of the curved member as shown in FIG. 25B or may be formed to surround only an edge of the curved member as shown in FIG. 25C.

The present invention is not limited to the abovementioned exemplary embodiments, but may be variously applied. In addition, the present invention may be variously modified by those skilled in the art to which the present invention pertains without departing from the gist of the present invention claimed in the claims.

The invention claimed is:

1. A curve-combined square pressure tank for accommodating a fluid at high pressure therein, the pressure tank comprising:

flat members disposed at upper and lower portions of the pressure tank;

a first curved member that connects edges of the flat member disposed at the upper portion and the flat member disposed at the lower portion and is formed with predetermined curvature; and a second curved member connecting neighboring curved edges of the first curved member, wherein the curve-combined square pressure tank comprises a stress-buffer portion formed therein to prevent stress discontinuity at a connection portion, wherein the stress-buffer portion includes a plurality of tension members in plate type disposed between the flat member disposed at the upper portion and the flat member disposed at the lower portion, wherein an outermost tension member among the plurality of tension members is spaced apart from a boundary (P) at which the first curved member and the flat member contact each other by a constant distance (d) toward the flat member to form the stress-buffer portion, and wherein the outermost tension member among the plurality of tension members includes a connection reinforcing member that extends to the first curved member.

2. A curve-combined square pressure tank for accommodating a fluid at high pressure therein, the pressure tank comprising:

flat members disposed at upper and lower portions of the pressure tank;

a first curved member that connects edges of the flat member disposed at the upper portion and the flat member disposed at the lower portion and is formed with predetermined curvature; and a second curved member connecting neighboring curved edges of the first curved member, wherein the curve-combined square pressure tank comprises a stress-buffer portion formed therein to prevent stress discontinuity at a connection portion, wherein the stress-buffer portion includes a plurality of tension members disposed between the flat member disposed at the upper portion and the flat member disposed at the lower portion, wherein the curve-combined square pressure tank has an approximately square section, and the flat members disposed at upper and lower portions of the pressure tank have polygonal shapes with one shorter side than the other side of corresponding facing sides, and wherein the curve-combined square pressure tank includes an internal grid structure formed therein and including a grid reinforcing member that is formed in grid patterns by arranging a plurality of beams perpendicularly to each other between the flat members, and a plurality of ring-type reinforcing members that extend from a portion of the plurality of beams and are coupled to an internal side of the adjacent first curved member, with predetermined curvature.

3. The curve-combined square pressure tank of claim 2, wherein an outermost beam among the plurality of beams is spaced apart from an edge connected to the flat member and the first curved member by a constant distance and is disposed inward.

4. The curve-combined square pressure tank of claim 2, wherein the plurality of beams has an H-shape sectional view.

5. The curve-combined square pressure tank of claim 4, wherein some of the plurality of ring-type reinforcing members have a T-shape sectional view.

* * * * *